Nov. 17, 1964     R. P. HALL     3,157,053
VERTICAL GYROSCOPE
Filed Nov. 20, 1961
Fig. 1
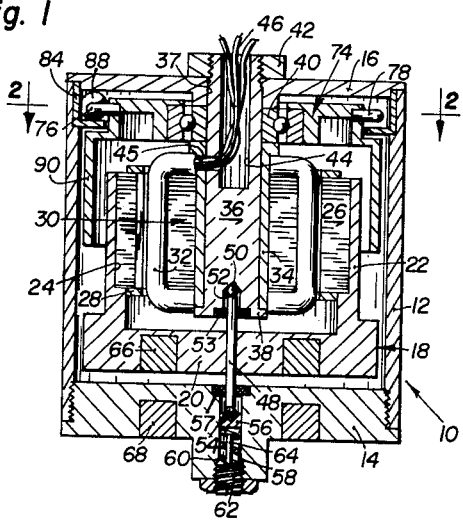
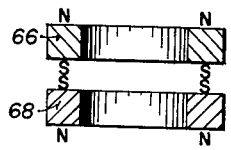
Fig. 3
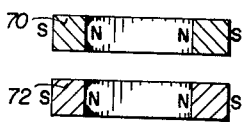
Fig. 4
Fig. 2
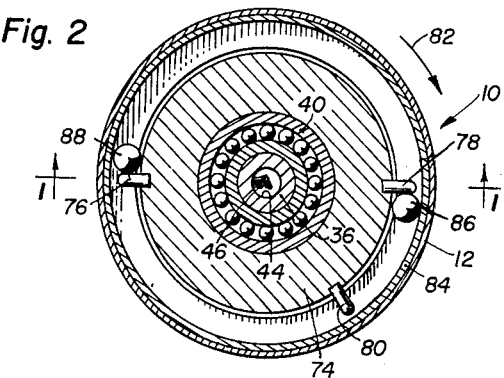
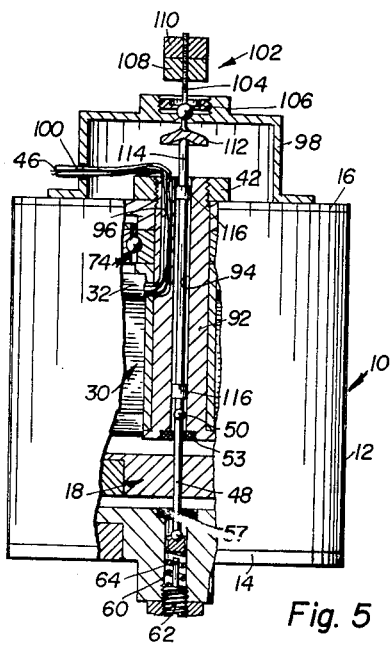
Fig. 5
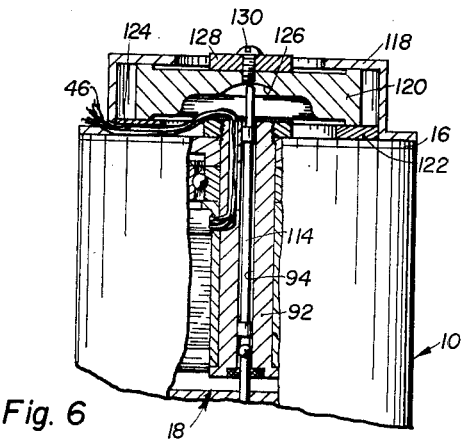
Fig. 6
INVENTOR.
ROBERT P. HALL
BY
BUCKHORN, CHEATHAM & BLORE
ATTORNEYS

United States Patent Office 3,157,053
Patented Nov. 17, 1964

3,157,053
VERTICAL GYROSCOPE
Robert P. Hall, Hillsboro, Oreg., assignor to Tektronix Instrument Co., Hillsboro, Oreg., a corporation of Oregon
Filed Nov. 29, 1961, Ser. No. 153,347
14 Claims. (Cl. 74—5.41)

This invention relates to a vertical gyroscope and more particularly to a gyroscope having its rotor supported for rotation about a vertical axis by magnetic repulsion between two magnetic elements. More specific aspects of the invention include an improved erecting mechanism for the vertical gyroscope and an improved turn and acceleration error compensation mechanism.

Gyroscopes of the general type contemplated by the present invention have relatively heavy rotors driven at a high rate of rotation about a vertically extending axis. It has been difficult to provide thrust bearings for supporting the rotor which have the required low friction for preventing heating of the bearings and which at the same time resist rapid wear as well as damage by shocks to which the gyroscope may be subjected in handling or in operation. For example, the vertical gyroscopes of the present invention have their chief utility in artifical horizon devices for airplanes, although they have utility wherever a vertical gyroscope is required. In airplanes, such gyroscopes are frequently subjected to substantial vertical shocks during landings with resultant damage to the thrust bearing conventionally employed.

In accordance with the present invention, the rotor of the gyroscope is supported magnetically and the lower end of the rotor shaft may be spaced from any supporting surface or be in light contact only with a surface which does not provide any substantial support of the rotor. The magnetic support is provided by magnetic elements having permanent magnetism, one of which is carried by the rotor and the other of which is carried by the casing or frame for the rotor. Such magnetic elements have their poles positioned relative to each other so that the two magnetic elements repel each other and thus support the rotor. Preferably such magnetic elements are annular in shape and preferably they are positioned in annular recesses in the rotor and frame for supporting the rotor. The magnetic elements are so selected that the force of repulsion between them is just sufficient to maintain the rotor shaft in light contact with an upper thrust member.

A preferred construction is to incorporate induction motor rotor windings of the squirrel cage type into the rotor itself and to drive the rotor by a high speed rotating field produced by energizing polyphase induction motor stator windings from a suitable source of alternating current power. The stator may be positioned within the portion of the rotor occupied by the rotor windings and may be secured to one end of the rotor supporting frame. The stator and rotor windings are supported in slots in laminated iron structures forming part of the stator and rotor, respectively, and such laminated structures are aligned so that substantially no axially directed magnetic forces due to the magnetic field are produced between the rotor and stator. Under these conditions the magnetic elements discussed above can hold the rotor in a definite axial position with minimum force on the thrust elements for the shaft of the rotor.

The gyroscope of the present invention also includes an improved erecting mechanism. Erecting mechanisms having metal balls movable in an annular channel by gravity or inertial forces and also moved in the channel by pins extending from an erecting rotor driven at slow speed are known in the prior art. Such erecting rotors have heretofore been driven from the gyroscope rotor either through speed reduction gearing or through a magnetic drive involving magnetic drag between a permanent magnet carried by one of the rotors and an electrical conducting member carried by the other. Escapement devices have been employed with such magnetic drives to regulate them to control the speed of the erecting rotor. Both the speed reduction gearing and the escapement devices of the two types of erecting rotor drives have been subject to rapid wear and required extensive maintenance.

In accordance with the present invention, the rotating electric field employed to drive the main gyroscope rotor is also employed to drive the erecting rotor. By thus driving the erecting rotor, it has been found possible to control the speed of the erecting rotor by journaling it on an antifriction bearing and employing a temperature stable oil of selected viscosity. Silicone oils which retain very nearly the same viscosity throughout an extended temperature range are commercially obtainable in various viscosities. By selecting an oil of suitable viscosity, the speed of rotation of the rotor of the erecting device can be controlled within quite narrow limits throughout a wide temperature range and over an extended period of time.

The magnetic support for the gyroscope rotor discussed above also enables the gyroscope to be provided with a simple and effective compensation device for turn and acceleration errors to which vertical gyroscopes are subject. In the type of erecting device illustrated in the present case having balls rolling in an annular channel as well as other types of vertical gyroscope erecting devices employing weights, such as those using pendulous weights to open and close valves allowing jets of compressed air to be ejected from the erecting device, are all subject to turn and acceleration errors.

When an airplane makes a turn, centrifugal force acts upon such balls or other weights to move them toward the side of the gyroscope frame which is toward the outer side of the turn. This unbalances the gyroscope assembly and causes precession of the gyroscope so as to raise or lower the artificial horizon connected to the gyroscope, depending upon the direction of the turn and the direction of rotation of the gyroscope rotor. Such action is very much more rapid than the operation of the erecting device which acts to align the gyroscope with the resultant of the gravity and inertial forces acting on the gyroscope.

A similar action occurs when the airplane suddenly accelerates or suddenly decelerates. Inertial forces act upon the balls or other weights to cause them to move and unbalance the gyroscope assembly. The result is to cause the gyroscope to precess so that the artificial horizon tilts to the right or left depending upon whether the gyroscope is subjected to an acceleration or a deceleration, and also depending upon the direction of rotation of the gyroscope rotor. Again such action takes place rapidly and in advance of any appreciable action of the erecting mechanism to align the edges of the gyroscope with the resultant of the gravity and intertial forces acting on the gyroscope.

With the magnetic support for the rotor of the gyroscope described above, it is possible to employ auxiliary weights which are moved by such inertial forces and act to move the rotor downwardly in its frame against the force of the repulsion between the magnetic elements supporting the rotor. This causes inertial forces due to turning or due to acceleration or deceleration of the airplane to act upon the gyroscope to at least in part compensate for the unbalance due to displacement of the weights associated with the erecting mechanism. The artificial horizon is held against substantial vertical movement as a result of centrifugal force due to a turn and against tilting due to inertial forces caused by accelerating or decelerating the airplane. Slight precession of the gyroscope occurs but for all usual turns or usual acceleration or deceleration actions, the inertial forces caused thereby are of such short duration that the erecting mechanism itself does not have time to cause substantial movement of the axes of the gyroscope into coincidence with the resultant of the gravity and the inertial forces referred to.

It is therefore an object of the invention to provide an improved vertical gyroscope having its gyroscope rotor magnetically supported.

Another object of the invention is to provide a vertical gyroscope in which magnetic repulsion between magnetic elements having permanent magnetism is employed to support the gyroscope rotor and to substantially eliminate thrust bearing wear and to also substantially eliminate damage to thrust bearings by vertical shocks.

Another object of the invention is to provide an improved vertical gyroscope having a simplified and effective erecting mechanism driven by a rotating magnetic field which also drives the main rotor of the gyroscope.

A further object of the invention is to provide a vertical gyroscope having an improved compensation mechanism substantially preventing turn and acceleration errors in an artificial horizon connected to such gyroscope.

Other objects and advantages of the invention will appear in the following description thereof, given in connection with the attached drawings of which:

FIG. 1 is a vertical section taken through the vertical axis of a gyroscope in accordance with the present invention and substantially upon the line 1—1 of FIG. 2;

FIG. 2 is a horizontal section taken on the line 2—2 of FIG. 1;

FIG. 3 is a fragmentary vertical section showing the magnetic support elements for the gyroscope rotor of FIGS. 1 and 2 with one suitable arrangement of magnetic poles;

FIG. 4 is a view similar to FIG. 3, showing another suitable arrangement of the magnetic poles of the magnetic elements;

FIG. 5 is a view in side elevation with parts broken away to show internal structure and illustrating a turn and acceleration error compensating device; and FIG. 6 is a partial view similar to FIG. 5, showing a modified form of turn and acceleration error compensating device.

Referring more particularly to the drawings, the gyroscope of FIGS. 1 and 2 includes a frame or casing 10 including a hollow cylindrical body member 12 provided with a lower end member 14 and an upper end member 16. Such end members together with the body member 12 provide a closed casing or frame for supporting a gyroscope rotor 18 journaled for rotation about an axis concentric with the body member 12. The rotor 18 is in the form of a cup with a disklike body portion 20 and an upwardly extending peripheral flange 22. The flange 22 has a counter bore 24 receiving an annular induction motor rotor member 26 made of a plurality of slotted annular magnetic iron laminations and provided with an induction motor squirrel cage winding 28 positioned in slots in the inner surface of the induction motor rotor member 26. Such induction motor rotor member 26 may be a press fit in the counterbore 24 of the gyroscope rotor flange 22.

A polyphase induction motor stator member 30 also made of a plurality of annular magnetic iron laminations and having a three-phase induction stator winding 32 in slots in the outer surface of the stator member is positioned within the rotor member 26. The laminations of the stator member 30 may be a press fit upon a bushing 34 which is mounted upon an elongated stator support 36 having its upper end extending through an aperture 37 in the end member 16 of the casing or frame 10. Thus the bushing 34 supporting the laminations of the stator member 30 is positioned between an annular shoulder 38 on the lower end of the stator support 36 and the inner race of an antifriction bearing 40. Such inner race is positioned between the bushing 34 and the closure member 16 and a nut 42 screw-threaded on the upper end of the stator support 36 clamps the bushing 34 and the inner race of the antifriction bearing 40 rigidly to the end member 16 of the frame 10. The stator support member 36 has an axially extending socket 44 therein which communicates with the interior of the casing of frame 10 through a radial aperture 45. Leads 46 for the stator winding 32 extend outwardly of the casing 10 through such aperture 45 in the socket 44.

The body portion 20 of the rotor 18 has a central axially extending rotor shaft 48 secured therein in any desired manner, for example, by a press fit. Such rotor shaft may extend axially a short distance both upwardly and downwardly from the body portion 20 of the rotor. The upper end of the rotor shaft 48 bears against a ball 50 positioned in a tapered end of an axial recess 52 in the stator support member 36 and is held against radial displacement with respect to such support member by an annular jewel 53 adhesively secured in a counterbore in the recess 52 at the lower end of the stator support member 36. The lower end of the rotor shaft 48 similarly engages a ball 54 carried in a conical socket in a cylindrical sliding member 56 in an axial bore 58 in the end member 14. The sliding member 56 is supported on a compression coil spring 60 positioned in the bore 58 and extending between the sliding member 56 and an adjusting set screw 62 screw-threaded into the lower end of the bore 58. The set screw 62 has an upwardly extending projection 64 positioned to limit downward movement of the sliding member 56 to thus limit downward movement of the rotor shaft 48 due to shocks to which the gyroscope may be subjected. An annular jewel 57 similar to the jewel 53 is adhesively secured in a counterbore in the upper end of the bore 58 to hold the lower end of the shaft 48 against radial displacement.

An annular magnetic element 66 is positioned in an annular groove in the lower surface of the body portion 20 of the rotor 18 so as to be concentric with the rotor and rotor shaft 48. A similar annular magnetic element 68 is positioned in an annular groove in the lower surface of the end member 14 of the casing or frame 10. Such magnetic elements 66 and 68 are of magnetized permanent magnet material and may have their poles arranged, for example, as shown in FIG. 3, so that they are polarized axially and have their south poles facing each other to provide a magnetic force of repulsion between the magnetic elements. It is apparent that both magnetic elements could be turned over so that their north poles face each other. Similarly, the modified annular permanent magnet elements 70 and 72 of FIG. 4 can be employed. Such magnetic elements are polarized radially and have their north poles at their inner annular surfaces and their south poles at their outer annular surfaces. It is apparent, however, that the polarity of both such magnetic elements can be reversed. Any of the arrangements of the magnetic elements referred to above have been found to be satisfactory.

The magnetic elements 66 and 68, or 70 and 72, are selected to have the correct magnetic strength and are positioned so that the force of repulsion between the two magnetic elements holds the rotor in its uppermost position with the shaft 48 of the rotor bearing with a slight amount of force only against the ball 50. Also the spring 60 exerts no more than a slight amount of force against the sliding member 56 and through such member and the ball 54 against the lower end of the shaft 48. There is, therefore, very little frictional force tending to retard rotation of the rotor 18 and it has been found that the magnetic field extending between the magnetic elements also exerts substantially no retarding force on the rotor. The magnetic elements are preferably of ceramic magnetic material now commercially available from several sources and which has high electrical resistivity so that eddy current losses in such elements are negligible. Apparently the field traversing the stator end member 14 of the casing 10 remains substantially stationary as there is substantially no magnetic drag on the rotor. Such rotor continues to coast for an extended period of time after any driving torque from the rotating magnetic field is discontinued by discontinuing the excitation of the stator winding 32.

It is apparent that the lower magnetic element 68 could be positioned in an annular groove in the top surface of the end member 14 of the frame 10 but a substantial spacing between the magnetic elements has been found desirable and one way of obtaining such substantial spacing without lengthening the frame 10 is to mount the magnetic elements 68 in the lower surface of end element 14. As stated above, the magnetic force of repulsion between the magnetic elements is just slightly greater than necessary to support the rotor 18 in its uppermost position but such magnetic force of repulsion increases rapidly if the rotor is driven downwardly by a vertical shock, so that bottoming of the shaft 48 and sliding member 56 on the projection 64 of the screw 62 very seldom, if ever, occurs unless the shock is extreme.

It will be understood that the casing or frame 10 of the gyroscope will be mounted in a suitable clamp ring which in turn is mounted in gimbal rings, as is conventional in vertical gyroscope structures. An erecting rotor 74 which is annular in form is mounted upon the outer race of the antifriction bearing 40, for example, by a press fit. Such rotor has its outer peripheral surface spaced from the wall of the body member 12 of the casing of the frame 10 and has three pins 76, 78 and 80 projecting radially outwardly from such outer peripheral surface. The pins 76 and 78 are diametrically opposed and the remaining pin 80 is positioned approximately 30° ahead of the pin 78, it being assumed that both the erecting rotor 74 and the gyroscope rotor 18 rotate in the direction of the arrow 82 of FIG. 2. An annular cup-shaped element 84 is positioned in an annular recess in the inner peripheral surface of the body member 12 of the frame 10 adjacent its upper end and, in conjunction with the outer peripheral surface of the erecting device rotor 74 and end member 16 of the frame 10 of the gyroscope, provides a ball race for a pair of metal balls 86 and 88. The ball 86 is positioned between the pins 78 and 80 on the other side of the erecting device rotor 74 from the pin 80, and the ball 88 is positioned between the pins 78 and 76. Such balls freely roll in the ball race thus provided within the limits provided by the pins 76, 78 and 80 except as they are carried around by the pins 76 and 78 during rotation of the erecting rotor 74.

The erecting rotor 74 has a downwardly projecting flange 90 at its outer periphery which partially surrounds the upper portion of the rotor 18. Such flange 90 is of electrically conducting material and a sufficient amount of the rotating magnetic field produced by energizing the stator winding 32 cuts the conducting material of the flange 90 to develop a torque rotating the erecting rotor 74. Such rotor should rotate at a relatively low rate of speed, for example, a speed between approximately 30 to 60 r.p.m., whereas the rotating field produced by energizing the winding 32 with 400 cycle three phase alternating power may, for example, have a speed of 24,000 r.p.m. The speed of the gyroscope rotor 18 will be somewhat less than the 24,000 r.p.m. mentioned due to induction motor slip. The induction motor torque developed due to eddy currents in the flange 90 of the erecting rotor 74 is very much less than that developed in the gyroscope rotor 18. The antifriction element 40 can, therefore, be made to function as an accurate speed regulator element for the rotor by lubricating such bearing with a temperature stable oil of selected viscosity. By using a silicone type of temperature stable oil, substantially any speed of rotation of the erecting rotor within a wide range of speeds can be produced and such speed will remain constant within narrow limits under widely varying temperature conditions. Silicone oils in the required viscosities are commercially available from several sources.

The erecting operation of erecting devices of the general type described above is well understood in the art and need not be described in detail. In such operation, any deviation of the gyroscope from the vertical will cause the balls to run rapidly to the lower side of the race provided by the cup member 84 except for any possible interference by the pins 76 and 78 and 80. In any event, one of the balls will very quickly run to such lower side. Rotation of the rotor 74 will cause the pins to carry such ball slowly up one side of the ball race and then allow it to again run rapidly down such ball race to its lower side. The net effect is that an average unbalancing weight is applied to the frame 10 of the gyroscope at right angles to the lowermost position of the ball race and this is the correct position for gravitational forces to cause the gyroscope to precess back toward the vertical position.

The modified gyroscope shown in FIG. 5 is essentially similar to that shown in FIGS. 1 and 2 except that a turn and acceleration error compensating device has been incorporated into the structure of the gyroscope. That is to say, the gyroscope has a casing 10 made up of body member 12 and end members 14 and 16, which may be identical with those of the FIGS. 1 and 2. Also such gyroscope may be a rotor 18 and stator member 30 as well as an erecting rotor 74 having structures entirely similar to those of FIGS. 1 and 2. The gyroscope of FIG. 5 does, however, have a modified stator support member 92 with an axial bore 94 extending entirely through the stator support member. An eccentric bore 96 is provided in the upper end of the stator support member 92 for the leads 46 for the stator windings 32. An inverted cup-shaped support 98 forming part of a turn and acceleration error compensating device is secured to the upper surface of the upper end member 16 and the leads 46 for the stator winding 32 extend outwardly through an aperture 100 in such support.

A compensating device weight structure 102 includes a vertically extending rod portion 104 mounted intermediate its ends in a ball and socket joint 106 in the upper portion of the support 98 so as to be capable of mutation within limits in any direction about the ball and socket joint 106. The upper end of the rod portion 104 is provided with a pair of weight members 108 and 110, both screw-threaded upon the upper end of such rod portion so that such weights can be adjusted in position vertically of the rod portion 104 and then locked in position by being tightened against each other. The lower end of the rod portion 104 carries a cam member 112 engaging a vertically extending push rod 114 slidably mounted in the bore 94 and provided with a pair of collars 116 forming spaced bearing portions in the bore 94.

The lower surface of the cam member 112 is formed with a cam surface so that pivotal motion of the weight structure 102 in any direction out of the vertical will depress the push rod 114. The lower end of such push rod engages a ball 50 which may be of the same type as the ball 50 of FIG. 1. The bearing structure for the rotor shaft 48 may otherwise be identical with that of that shown in FIG. 1 and the same reference numbers have been applied thereto. It will be apparent that depression of the push rod 114 by the cam member 112 will depress the rotor 18 against the action of the supporting magnetic field and against any spring force of the spring 60.

As stated above, it will be understood that the casing or frame 10 of the vertical gyroscope will be mounted in a clamp ring in turn mounted in gimbal rings, as is conventional in vertical gyroscopes, and that an artificial horizon may be connected thereto, as is also conventional, the artificial horizon line giving the impression of staying in fixed position as the airplane banks in either direction or as the nose of the airplane tips up or tips down. With an erecting mechanism of the type employed in the present invention and, in fact, with any type of erecting mechanism depending upon the action of movable balls or other weights, such as pendulous weights controlling air valves, the weights will move in the direction of a resulting inertial force whenever the airplane turns to the left or to the right, or accelerates or decelerates. The movement of such weights unbalance the gyroscope in its gimbal rings and a force causing precession of the gyroscope is applied to the rotor of the gyroscope through its bearings due to the action of gravity upon the unbalanced weight. The resulting precession is such that the artificial horizon rises or falls when the airplane makes a turn, depending upon the direction of the turn and the direction of rotation of the gyroscope rotor, or tilts when the airplane accelerates or decelerates. This is a separate and distinct action from the precession caused by forces applied by the erecting mechanism. The erecting mechanism acts much more slowly and tends to bring the axis of the gyroscope rotor into coincidence with the resultant of gravity and the inertial force acting on the gyroscope.

In the device of FIG. 5, the weights 102 are also caused to move by the inertial forces due to a turn or by acceleration or deceleration of the plane. This adds to the unbalance discussed above but also depresses the rotor 18 of the gyroscope through the push rod 114 and ball 50. Thrusting the heavy weight of the rotor downwardly also unbalances the gyroscope in an axial direction in its gimbal rings and the unbalancing is such that an inertial force is also applied to the gyroscope which opposes the forces due to the unbalanced position of the balls or other weights as discussed above. By adjusting the weights 108 and 110 vertically on the rod portion 104, the two forces acting on the gyroscope can be made to largely balance each other so that there is less rising or lowering of the artificial horizon during a turn, or less tipping of such horizon during changes in forward speed of the airplane than is the case when the compensating mechanism of the present invention is not employed. It will be apparent that the magnetic force from the supporting magnets 66 and 68 will raise the gyroscope rotor to its normal position and cause the push rod 114 to return the rod portion 104 back to its vertical position.

The further modified gyroscope shown in FIG. 6 may be identical with that of FIG. 5 except for a modified turn and acceleration error compensating device. Such device includes a support 118 secured to the upper end member 16 of the gyroscope in which is positioned a circular weight 120. Such weight is mounted for sliding movement between a guiding surface on an annular member 122 resting upon the top of the end member 16 and the inner surface of the top of the support 118. The annular member 122 has a radially extending aperture or bore 124 aligning with an aperture in the support 118 to provide for passage of the leads 46.

The sliding weight 120 has a reentrant portion in its lower surface terminating in a dome-shaped cam surface 126 in contact with the upper end of a push rod 114 which may be identical with the push rod 114 of FIG. 5 and which may be slidable in the axially extending bore 94 in the stator support 92. It will be apparent that sliding motion of the weight 120 under acceleration forces directed diametrically of the gyroscope rotor due to the airplane going around a turn or changing its forward speed, will cause the weight 120 to move in the direction of such forces. This will depress the rotor 118 of the gyroscope to unbalance the gyroscope in a direction axially of the rotor to produce inertial forces acting in the opposite direction from the gravitational forces due to diametrical shifting of the balls or other weights of the erecting mechanism and similar shifting of the weight 120. The weight 120 may have a washer 128 secured thereto by a screw 130. Washers 128 of different weights may be substituted for each other to vary the total weight subjected to any inertial force which tend to cause sliding motion of the weight 128 to thereby adjust the amount the rotor is depressed by a given inertial force. The general action of the compensating mechanism of the gyroscope of FIG. 6 is the same as that described in more detail with respect to FIG. 5, and again errors due to turns and aceleration and deceleration of the airplane are largely eliminated.

I claim:

1. A vertical gyroscope comprising:
a gyroscope frame,
a gyroscope rotor having a vertically extending axis,
means mounting said rotor in said frame for rotation about said axis and for limited movement axially of said rotor between an upper and lower position in said frame,
induction motor rotor windings carried by said rotor,
a stator secured to said frame and having induction motor stator windings thereon for producing a rotating magnetic field causing rotation of said rotor,
said rotor being a cup-shaped member having a disk-shaped body portion axially spaced from said stator with an axially extending peripheral flange surrounding said stator and carrying said rotor windings,
first annular permanent magnet means carried by said body portion of said rotor and having annular poles concentric with said axis,
second annular permanent magnet means carried by said frame below said first magnet means and having annular poles concentric with said rotor and positioned to repel said first magnet means and hold said rotor in said upper position
and a rotor shaft extending through said disk-shaped body portion and having one end journaled in said body portion and the other end journaled in one end of said stator.

2. A vertical gyroscope comprising:
a gyroscope frame,
a gyroscope rotor having a vertically extending axis,
means mounting said rotor in said frame for rotation about said axis,
electric motor windings carried by said rotor,
a stationary motor member secured to said frame and having electric motor windings thereon for producing a rotating magnetic field causing rotation of said rotor,
gyroscope erecting means including a second rotor mounted for rotation in said frame about said axis and free of any driving connection with said gyroscope rotor, said second rotor having an electrically conducting portion positioned in said rotating field to produce rotation of said second rotor at a lesser rate than the rotation of said gyroscope rotor.

3. A vertical gyroscope comprising:
a gyroscope frame,
a gyroscope rotor having a vertically extending axis,
means mounting said rotor in said frame for rotation about said axis,
electric motor windings carried by said rotor,
a stationary motor member secured to said frame and having electric motor windings thereon for producing a rotating magnetic field causing rotation of said rotor,
gyroscope erecting means including a second rotor mounted for rotation in said frame about said axis and having an electrically conducting portion positioned in said rotating field to cause rotation of said second rotor,
and friction means maintaining the rate of rotation of said second rotor below that of said gyroscope rotor and within a selected range including an antifriction bearing for mounting said second rotor in said frame and a temperature stable oil of selected viscosity lubricating said bearing.

4. A vertical gyroscope comprising:
a gyroscope frame,
a gyroscope rotor having a vertically extending axis,
means mounting said rotor in said frame for rotation about said axis,
induction motor rotor windings carried by said rotor,
a stator secured to said frame and having induction motor stator windings thereon for producing a rotating field causing rotation of said rotor,
said rotor having an axially extending peripheral flange surrounding said stator and carrying said rotor windings,
gyroscope erecting means including a second rotor mounted for rotation in said frame about said axis free of any driving connection with said gyroscope rotor, said second rotor having an electrically conducting peripheral flange extending around said flange of said gyroscope rotor and positioned in said rotating field to cause rotation of said second rotor at a lesser rate than said gyroscope rotor.

5. A vertical gyroscope comprising:
a gyroscope frame,
a gyroscope rotor having a vertically extending axis,
means mounting said rotor in said frame for rotation about said axis,
induction motor rotor windings carried by said rotor,
a stator secured to said frame and having induction motor stator windings thereon for producing a rotating magnetic field causing rotation of said rotor,
gyroscope erecting means including a second rotor mounted for rotation in said frame about said axis and having an electrically conducting peripheral flange extending around said flange of said gyroscope rotor and positioned in said rotating field to cause rotation of said second rotor,
and friction means maintaining the rate of rotation of said second rotor below that of said gyroscope rotor and within a selected range including an antifriction bearing for mounting said second rotor in said frame and a temperature stable oil of selected viscosity lubricating said bearing.

6. A vertical gyroscope comprising:
a gyroscope frame,
a gyroscope rotor having a vertically extending axis,
means mounting said rotor in said frame for rotation about said axis and for limited movement axially of said rotor between an upper and lower position in said frame including means yieldingly urging said rotor to its upper position,
gyroscope erecting means including weights movable by inertial forces directed diametrically of said rotor to unbalance said gyroscope and cause turn and acceleration errors,
and compensation means actuated by said inertial forces for moving said rotor downwardly to compensatingly unbalance said gyroscope and reduce said errors.

7. A vertical gyroscope comprising:
a gyroscope frame,
a gyroscope rotor having a vertically extending axis,
means mounting said rotor in said frame for rotation about said axis and for limited movement axially of said rotor between an upper and lower position in said frame including means yieldingly urging said rotor to its upper position,
gyroscope erecting means including weights movable by inertial forces directed diametrically of said rotor to unbalance said gyroscope and cause turn and acceleration errors,
and compensating means actuated by said inertial forces including a weight moved by said inertial forces and cam means associated with said weight for moving said rotor downwardly to compensatingly unbalance said gyroscope and reduce said errors.

8. A vertical gyroscope comprising:
a gyroscope frame,
a gyroscope rotor having a vertically extending axis,
means mounting said rotor in said frame for rotation about said axis and for limited movement axially of said rotor between an upper and lower position in said frame including means yieldingly urging said rotor to said upper position,
gyroscope erecting means including a second rotor mounted for rotation in said frame about said axis at a lesser rate of rotation than said gyroscope rotor and including weights movable by inertial forces directed diametrically of said rotors to unbalance said gyroscope and cause turn and acceleration errors,
and compensating means actuated by said inertial forces for moving said gyroscope rotor downwardly to compensatingly unbalance said gyroscope and reduce said errors.

9. A vertical gyroscope comprising:
a gyroscope frame,
a gyroscope rotor having a vertically extending axis,
means mounting said rotor in said frame for rotation about said axis and for limited movement axially of said rotor between an upper and lower position in said frame,
first permanent magnet means carried by said rotor,
second permanent magnet means carried by said frame below said first magnet means and having poles positioned to repel said first magnet means to yieldingly hold said rotor in said upper position,
gyroscope erecting means including weights movable by inertial forces directed diametrically of said rotor to unbalance said gyroscope and cause turn and acceleration errors,
and compensating means actuated by said inertial forces for moving said rotor downwardly to compensatingly unbalance said gyroscope and reduce said errors.

10. A vertical gyroscope comprising:
a gyroscope frame,
a gyroscope rotor having a vertically extending axis,
means mounting said rotor in said frame for rotation about said axis and for limited movement axially of said rotor between an upper and lower position in said frame,
first permanent magnet means carried by said rotor,
second permanent magnett means carried by said frame below said first magnet means and having poles positioned to repel said first magnet means to yieldingly hold said rotor in said upper position,
gyroscope erecting means including weights movable by inertial forces directed diametrically of said rotor to unbalance said gyroscope and cause turn and acceleration errors,
and compensating means actuated by said inertial forces including a weight moved by said inertial forces and cam means actuated with said weight for moving said rotor downwardly to compensatingly unbalance said gyroscope and reduce said errors.

11. A vertical gyroscope comprising:
a gyroscope frame,
a gyroscope rotor having a vertically extending axis,
means mounting said rotor in said frame for rotation about said axis and for limited movement axially of said rotor between an upper and lower position in said frame and having an axially extending peripheral flange,
induction motor rotor windings carried by said rotor within said flange,
a stator secured to said frame and positioned within said rotor windings and having induction motor stator windings thereon for producing a rotating field causing rotation of said rotor, first permanent magnet means carried by said rotor,
second permanent magnet means carried by said frame below said first magnet means and having poles positioned to repel said first magnet means to yieldingly hold said rotor in said upper position,
gyroscope erecting means including a second rotor mounted for rotation in said frame about said axis and having an axially extending peripheral flange of electrical conducting material surrounding said flange of said gyroscope rotor to cause said second rotor to be driven by said rotating field at a lesser rate of rotation than said gyroscope rotor and including weights movable by inertial forces directed diametrically of said rotors to unbalance said gyroscope and cause turn and acceleration errors,
and compensating means actuated by said inertial forces for moving said gyroscope rotor downwardly to compensatingly unbalance said gyroscope and reduce said errors.

12. A vertical gyroscope comprising:
a gyroscope frame,
a gyroscope rotor having a vertically extending axis,
means mounting said rotor in said frame for rotation about said axis and for limited movement axially of said rotor between an upper and lower position in said frame and having an axially extending peripheral flange,
induction motor rotor windings carried by said rotor within said flange,
a stator secured to said frame and positioned within said rotor windings and having induction motor stator windings thereon for producing a rotating field causing rotation of said rotor,
first permanent magnet means carried by said rotor,
second permanent magnet means carried by said frame below said first magnet means and having poles positioned to repel said first magnet means to yieldingly hold said rotor in said upper position,
gyroscope erecting means including a second rotor mounted for rotation in said frame about said axis and having an axially extending peripheral flange of electrical conducting material surrounding said flange of said gyroscope rotor and frictional retarding means for causing said second rotor to be driven by said rotating field at a lesser rate of rotation than said gyroscope rotor and including weights movable by inertial forces directed diametrically of said rotors to unbalance said gyroscope and cause turn and acceleration errors,
and compensating means actuated by said forces including a weight moved by said inertial forces and cam means associated with said weights for moving said gyroscope rotor downwardly to compensatingly unbalance said gyroscope and reduce said errors.

13. A vertical gyroscope comprising:
a gyroscope frame,
a gyroscope rotor having a vertically extending axis,
means mounting said rotor in said frame for rotation about said axis and for limited movement axially of said rotor between an upper and lower position in said frame,
induction motor rotor windings carried by said rotor,
a stator secured to said frame and having induction motor stator windings thereon for producing a rotating magnetic field causing rotation of said rotor,
said rotor being a cup-shaped member having a disk-shaped body portion axially spaced from said stator with an axially extending peripheral flange surrounding said stator and carrying said rotor windings,
first annular permanent magnet means carried by said body portion of said rotor and having annular poles concentric with said axis,
second annular permanent magnet means carried by said frame below said first magnet means and having annular poles concentric with said rotor and positioned to repel said first magnet means and hold said rotor in said upper position,
a rotor shaft extending through said disk-shaped body portion and having one end journaled in said body portion and its other end journaled in one end of said stator,
and gyroscope erecting means including a second rotor mounted for rotation in said frame about said axis and having an electrically conducting portion positioned in said rotating field to produce rotation of said second rotor at a lesser rate than the rotation of said gyroscope rotor.

14. A vertical gyroscope comprising:
a gyroscope frame,
a gyroscope rotor having a vertically extending axis,
means mounting said rotor in said frame for rotation about said axis and for limited movement axially of said rotor between an upper and lower position in said frame,
induction motor rotor windings carried by said rotor,
a stator secured to said frame and having induction motor stator windings thereon for producing a rotating magnetic field causing rotation of said rotor,
said rotor being a cup-shaped member having a disk-shaped body portion axially spaced from said stator with an axially extending peripheral flange surrounding said stator and carrying said rotor windings,
first annular permanent magnet means carried by said body portion of said rotor and having annular poles concentric with said axis,
second annular permanent magnet means carried by said frame below said first magnet means and having annular poles concentric with said rotor and positioned to repel said first magnet means and hold said rotor in said upper position,
a rotor shaft extending through said disk-shaped body portion and having one end journaled in said body portion and its other end journaled in one end of said stator,
gyroscope erecting means including a second rotor mounted for rotation in said frame about said axis and having an electrically conducting portion positioned in said rotating field to produce rotation of said second rotor at a lesser rate than the rotation of said gyroscope rotor,
said second rotor being a cup-shaped element having a peripheral flange extending around the peripheral flange of the gyroscope rotor and being journaled in said frame adjacent the other end of said stator.

References Cited in the file of this patent

UNITED STATES PATENTS

| | | |
|---|---|---|
| 1,311,768 | Gray et al. | July 29, 1919 |
| 2,254,698 | Hansen | Sept. 2, 1941 |
| 2,556,097 | Mead | June 5, 1951 |
| 2,747,944 | Baermann | May 29, 1956 |
| 2,864,017 | Waltscheff | Dec. 9, 1958 |